(12) United States Patent
Turnbull et al.

(10) Patent No.: US 6,336,652 B1
(45) Date of Patent: Jan. 8, 2002

(54) DEPLOYMENT DOOR FOR AN AIR BAG MODULE

(75) Inventors: Roy C. Turnbull, Shelby Township; Kurt F. Fischer, Oxford; Andrew J. Smydra, Rochester, all of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/710,047

(22) Filed: Nov. 10, 2000

(51) Int. Cl.[7] .................................................. B60R 21/20
(52) U.S. Cl. .................................................... 280/728.3
(58) Field of Search ............................. 280/728.3, 731, 280/732

(56) References Cited

U.S. PATENT DOCUMENTS

| | | | |
|---|---|---|---|
| 4,878,689 A | * 11/1989 | Mitzkus et al. | 280/731 |
| 5,183,289 A | 2/1993 | Zeller et al. | |
| 5,238,264 A | * 8/1993 | Barnes | 280/732 |
| 5,295,707 A | 3/1994 | Satoh et al. | |
| 5,350,191 A | * 9/1994 | Kokeguchi et al. | 280/732 |
| 5,395,133 A | 3/1995 | Lauritzen et al. | |
| 5,533,747 A | 7/1996 | Rose | |
| 6,012,735 A | * 1/2000 | Gray et al. | 280/728.2 |

\* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

An apparatus (10) for use in a vehicle comprises an air bag module (30) including an inflatable air bag (50) and an opening (42) through which the air bag deploys when inflated. A deployment door (60) covers the opening (42). The deployment door (60) includes a first edge (90) and a hinge area (100) extending parallel to the first edge. The hinge area (100) has an attachment portion (102) connected to the vehicle and a hinge portion (104) at which the deployment door (60) pivots to allow the air bag (50) to deploy. The hinge portion (104) has oppositely disposed first and second ends (114 and 116). The deployment door (60) has a second edge (92) disposed opposite the first edge (90). The second edge (92) includes a central portion (126). The deployment door (60) further includes first and second areas (122 and 124) of reduced stiffness. The first area (122) of reduced stiffness extends from the first end (114) of the hinge portion (104) toward the central portion (126) of the second edge (92) and defines a first side section (130) of the deployment door (60). The second area (124) of reduced stiffness extends from the second end (116) of the hinge portion (104) toward the central portion (126) of the second edge (92) and defines a second side section (136) of the deployment door (60). The first and second areas (122 and 124) of reduced stiffness enable the first and second side sections (130 and 136), respectively, of the deployment door (60) to flex around parts (50) of the vehicle occupant that may be blocking pivotal movement of the deployment door during deployment of the air bag (50).

16 Claims, 4 Drawing Sheets

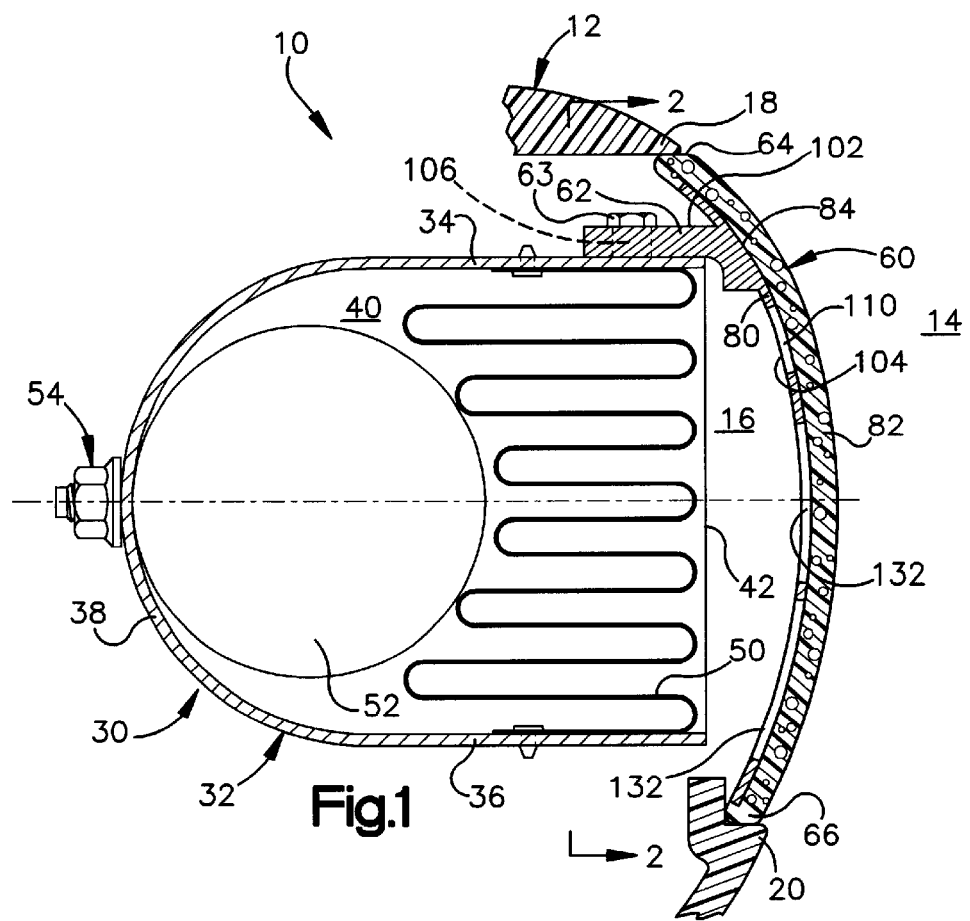
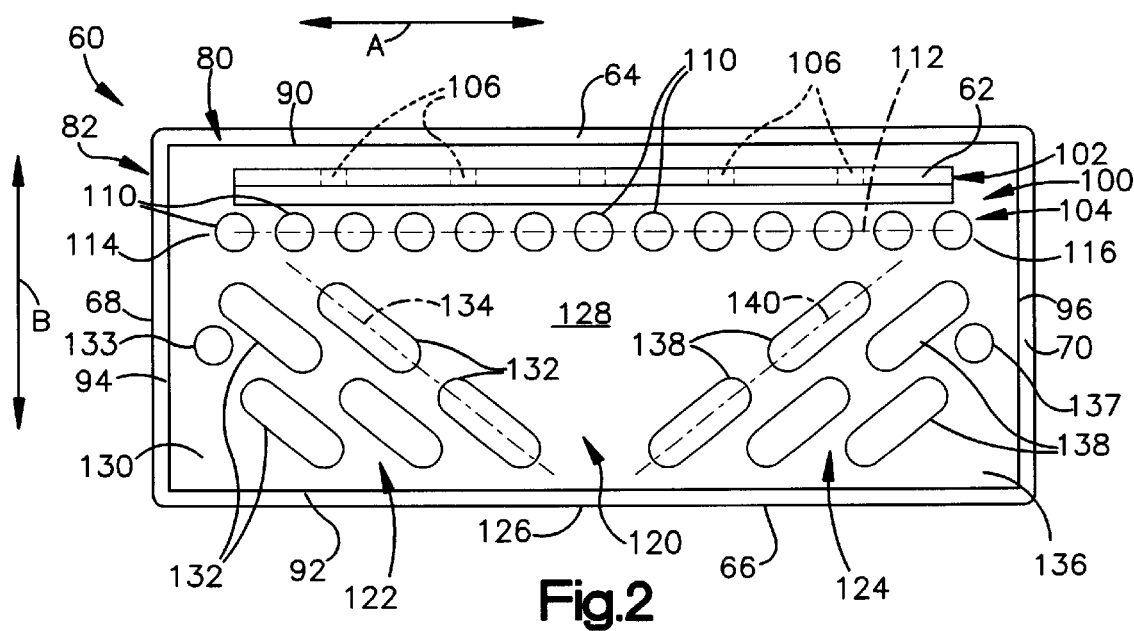

DEPLOYMENT DOOR FOR AN AIR BAG MODULE

TECHNICAL FIELD

The present invention is directed to a deployment door that is opened upon inflation of an air bag from an air bag module mounted in a vehicle.

BACKGROUND OF THE INVENTION

It is known to use an inflatable air bag in a vehicle to help protect a vehicle occupant in the event of a vehicle collision. The air bag is inflated by inflation fluid from an actuatable inflator. The inflator and the air bag are typically assembled together in an air bag module. The air bag module also includes a reaction canister, which contains and supports the air bag and the inflator. The reaction canister has a deployment opening through which the air bag moves when inflated by the inflator. A deployment door is secured over the deployment opening to conceal the air bag module in the vehicle. Deployment doors are often manufactured by applying a urethane foam over a metal substrate. It is known to punch additional openings in the substrate to aid in material flow during the foaming process. It is also known to place openings in the substrate to weaken the substrate in an area where hinging action of the deployment door is desired.

In the event of a vehicle collision, the inflator is actuated and begins to inflate the air bag with inflation fluid from the inflator. As the air bag inflates, the air bag moves through the deployment opening and engages the deployment door. The inflating air bag pushes against the deployment door, causing the deployment door to pivot about a weakened hinge portion of the deployment door. The inflating air bag thus opens the deployment opening by pivoting the deployment door away from the deployment opening so that the air bag can inflate into the passenger compartment of the vehicle.

The deployment door may contact parts of the occupant's body, such as the occupant's head. The deployment door can then transfer the force of the inflating air bag to the occupant's head until the occupant's head is moved far enough away from the deployment opening for the air bag to continue inflating and expanding into the passenger compartment. A deployment door that flexes around a vehicle occupant would allow the air bag to expand laterally around the sides of the deployment door and thereby reduce the force transferred to the occupant's body during deployment of the air bag.

SUMMARY OF THE INVENTION

The present invention is an apparatus for use in a vehicle. The apparatus comprises an air bag module mounted in the vehicle. The air bag module includes an inflatable air bag for helping to protect a vehicle occupant in the event of a vehicle collision and an opening through which the air bag deploys when inflated. A deployment door covers the opening. The deployment door includes a first edge and a hinge area extending parallel to the first edge. The hinge area has an attachment portion connected to the vehicle and a hinge portion at which the deployment door pivots to allow the air bag to deploy. The hinge portion has oppositely disposed first and second ends. The deployment door has a second edge disposed opposite the first edge. The second edge includes a central portion. The deployment door further includes first and second areas of reduced stiffness. The first area of reduced stiffness extends from the first end of the hinge portion toward the central portion of the second edge and defines a first side section of the deployment door. The second area of reduced stiffness extends from the second end of the hinge portion toward the central portion of the second edge and defines a second side section of the deployment door. The first and second areas of reduced stiffness enable the first and second side sections, respectively, of the deployment door to flex around parts of the vehicle occupant that may be blocking pivotal movement of the deployment door during deployment of the air bag.

The deployment door comprises a substrate made of a relatively rigid first material and an outer layer made of a relatively flexible second material that is applied to the substrate.

In accordance with one embodiment of the present invention, the substrate includes an array of first apertures that form the first area of reduced stiffness in the deployment door and an array of second apertures that form the second area of reduced stiffness in the deployment door.

In accordance with another embodiment of the present invention, the substrate includes a first set of ribs in the first side section of the deployment door, a second set of ribs in the second side section of the deployment door, and a centrally located third set of ribs. The first area of reduced stiffness in the deployment door is defined between the first set of ribs and the third set of ribs. The second area of reduced stiffness in the deployment door is defined between the second set of ribs and the third set of ribs.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a schematic sectional view of an apparatus constructed in accordance with the present invention;

FIG. 2 is a view taken along line 2—2 in FIG. 1 with parts omitted for clarity;

DESCRIPTION OF PREFERRED EMBODIMENTS

Figure 3:
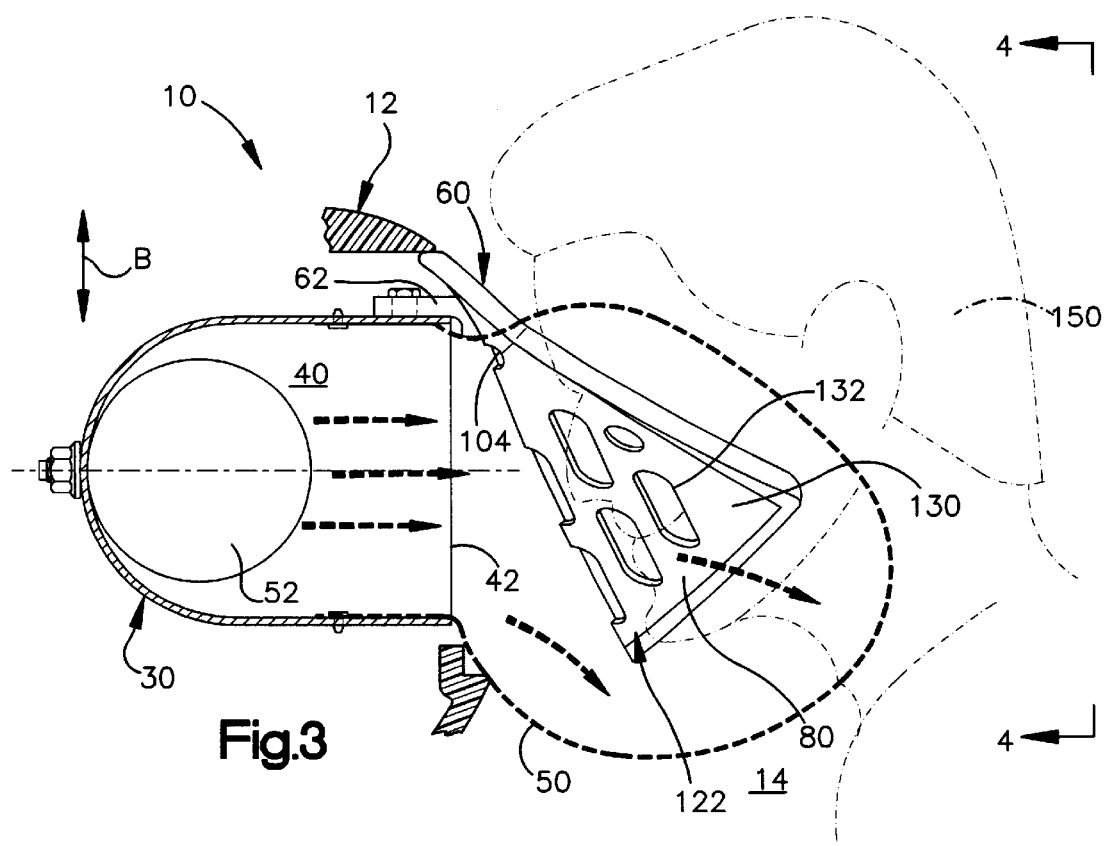
FIG. 3 is a view similar to FIG. 1 illustrating parts of the apparatus in different positions.

The present invention is directed to a deployment door that is opened upon inflation of an air bag from an air bag module mounted in a vehicle. As representative of the present invention, FIG. 1 schematically illustrates an apparatus 10 mounted, in a manner not shown, in an instrument panel 12 that extends laterally through a passenger compartment 14 in a vehicle (not shown). The instrument panel 12 includes an opening 16 defined in part by an upper section 18 of the instrument panel and a lower section 20 of the instrument panel. The opening 16 in the instrument panel 12 is located directly in front of a front passenger seat (not shown) in the passenger compartment 14 of the vehicle.

The apparatus 10 comprises an air bag module 30 mounted in the instrument panel 12 and a deployment door 60 that covers the air bag module and conceals the air bag module inside the instrument panel. The air bag module 30 fits through the opening 16 in the instrument panel 12 and is secured in a known manner (not shown) to the vehicle.

The air bag module 30 includes a reaction canister 32 having upper and lower walls 34 and 36 that are connected by an arcuate inner wall 38. The reaction canister 32 further includes oppositely disposed side walls (not shown) as is known in the art. The side walls, the inner wall 38, and the upper and lower walls 34 and 36 together define a chamber 40 in the reaction canister 32. Further, the side walls and the upper and lower walls 34 and 36 of the reaction canister 32 together define a deployment opening 42 opposite the inner wall 38 of the reaction canister. It should be understood by those skilled in the art that the reaction canister 32 need not be a separate part, but could instead be provided by portions (not shown) of the vehicle instrument panel 12.

The air bag module 30 further includes an inflatable air bag 50 and an actuatable inflator 52 for, when actuated, providing inflation fluid to inflate the air bag. The inflator 52 is attached to the reaction canister 32 in a known manner, such as by fasteners 54. The air bag 50 is secured to the reaction canister 32 about the inflator 52 as is known in the art.

The deployment door 60 covers the opening 16 in the instrument panel 12 and the deployment opening 42 in the reaction canister 32. The deployment door 60 thus conceals the air bag module 30 in the instrument panel 12. In the illustrated embodiment, a flange portion 62 of the deployment door 60 is secured to the reaction canister 32 in a known manner, such as by fasteners 63. It should, however, be understood that the deployment door 60 could instead be attached to the instrument panel 12 or other structure (not shown) behind the instrument panel.

The deployment door 60 is defined by oppositely disposed top and bottom portions 64 and 66, and oppositely disposed first and second lateral side portions 68 and 70 (FIG. 2). The deployment door 60 comprises a substrate 80 made of a relatively rigid material, such as metal, and an outer layer 82 made of a relatively flexible material, such as a polymer. In accordance with a first embodiment of the invention, the outer layer 82 is a polyurethane foam that is applied to at least an outer surface 84 (FIG. 1) of the metal substrate 80. It is contemplated that polyurethane foam could also be applied to an inner surface (not numbered) of the substrate 80 that faces the air bag module 30.

The substrate 80 of the deployment door 60 has generally parallel upper and lower edges 90 and 92 (FIG. 2) that extend in the lateral direction indicated by arrow A. The substrate 80 also has generally parallel first and second side edges 94 and 96 that extend between the upper and lower edges 90 and 92 in the vertical direction indicated by arrow B. A hinge area 100 of the substrate 80 extends adjacent the upper edge 90 and runs parallel to the upper edge. It should be apparent to those skilled in the art that the hinge area 100 could alternatively be located adjacent the lower edge 92 of the substrate 80.

The hinge area 100 includes an attachment portion 102 and a hinge portion 104. The flange 62, which secures the deployment door 60 to the reaction canister 32, projects from the attachment portion 102 and includes a plurality of openings 106 for receiving fasteners 63. The hinge portion 104 is a weakened area of the substrate 80 at which the deployment door 60 pivots to allow the air bag 50 to deploy.

The weakened area of the hinge portion 104 is formed by a plurality of openings 110 that are punched in the substrate 80 along a first axis 112. The hinge portion 104 of the substrate 80 has first and second ends 114 and 116. The first end 114 of the hinge portion 104 lies adjacent the first side edge 94 of the substrate 80 and the second end 116 of the hinge portion lies adjacent the second side edge 96 of the substrate.

The substrate 80 further includes a main body portion 120 located below, as viewed in the Figures, the hinge area 100. The main body portion 120 of the substrate has first and second areas 122 and 124 of reduced stiffness that extend between the hinge portion 104 and the lower edge 92. The first area 122 of reduced stiffness extends from the first end 114 of the hinge portion 104 toward a central portion 126 of the lower edge 92 of the substrate 80. The first area 122 of reduced stiffness thus extends at an angle relative to the lateral direction A and the vertical direction B. The first area 122 of reduced stiffness divides part of the main body portion 120 into a central section 128 and a first side section 130.

In accordance with the embodiment of FIGS. 1–4, the first area 122 of reduced stiffness is formed by an array of slots 132 punched in the substrate 80. Each of the slots 132 extends at an angle relative to the upper and lower edges 90 and 92 of the substrate 80. The slots 132 extend generally parallel to a second axis 134 that runs from the first end 114 of the hinge portion 104 toward the central portion 126 of the lower edge 92. The second axis 134 thus extends transverse to the first axis 112 about which the deployment door 60 pivots. The array of slots 132 weakens the substrate 80 so that, as is described further below, the first side section 130 of the deployment door 60 can bend relative to the central section 128. The first area 122 of reduced stiffness can also include one or more circular openings 133 to further weaken the first area of reduced stiffness.

The second area 124 of reduced stiffness extends from the second end 116 of the hinge portion 104 toward the central portion 126 of the lower edge 92 of the substrate 80. The second area 124 of reduced stiffness thus extends at an angle relative to the lateral direction A and the vertical direction B. The second area 124 of reduced stiffness divides a second side section 136 from the central section 126 of the main body portion 120 of the substrate 80.

In accordance with the embodiment of FIGS. 1–4, the second area 124 of reduced stiffness is formed by an array of slots 138 punched in the substrate 80. Each of the slots 138 extends at an angle relative to the upper and lower edges 90 and 92 of the substrate 80. The slots 138 extend generally parallel to a third axis 140 that runs from the second end 116 of the hinge portion 104 toward the central portion 126 of the lower edge 92. The third axis 140 thus extends transverse to the first axis 112 and transverse to the second axis 134. The array of slots 138 weakens the substrate so that, as is described further below, the second side section 136 of the deployment door 60 can bend relative to the central section 126. The second area 124 of reduced stiffness can also include one or more circular openings 137 to further weaken the second area of reduced stiffness.

In the event of a vehicle collision, the inflator 52 is actuated and begins to inflate the air bag 50 with inflation fluid from the inflator. As the air bag 50 inflates, the air bag moves through the deployment opening 42 and engages the deployment door 60. The inflating air bag 50 pushes against the deployment door 60, causing the deployment door to pivot at the hinge portion 104 about the first axis 112. As is shown in FIG. 3, the inflating air bag 50 uncovers the deployment opening 42 by pivoting the deployment door 60 out of the way so that the air bag can inflate into the passenger compartment 14 of the vehicle.

If, however, an occupant is positioned too close to the instrument panel 12, the pivoting movement of the deployment door 60 may be blocked by parts of the occupant's body, such as the occupant's head 150 illustrated in FIG. 3. This impedes the inflation of the air bag 50 into the passenger compartment 14 of the vehicle. Traditionally, a deployment door would transfer the force of the inflating air bag 50 to the occupant's head 150 until the occupant's head is moved far enough away from the deployment opening 42 for the air bag to continue inflating and expanding into the passenger compartment 14. The deployment door 60 according to the present invention, however, flexes around the head 150 of the occupant so that the air bag 50 can expand around the lateral sides 68 and 70 of the deployment door. Such lateral expansion of the air bag 50 reduces the force transferred to the occupant's head during deployment of the air bag.

Figure 4:
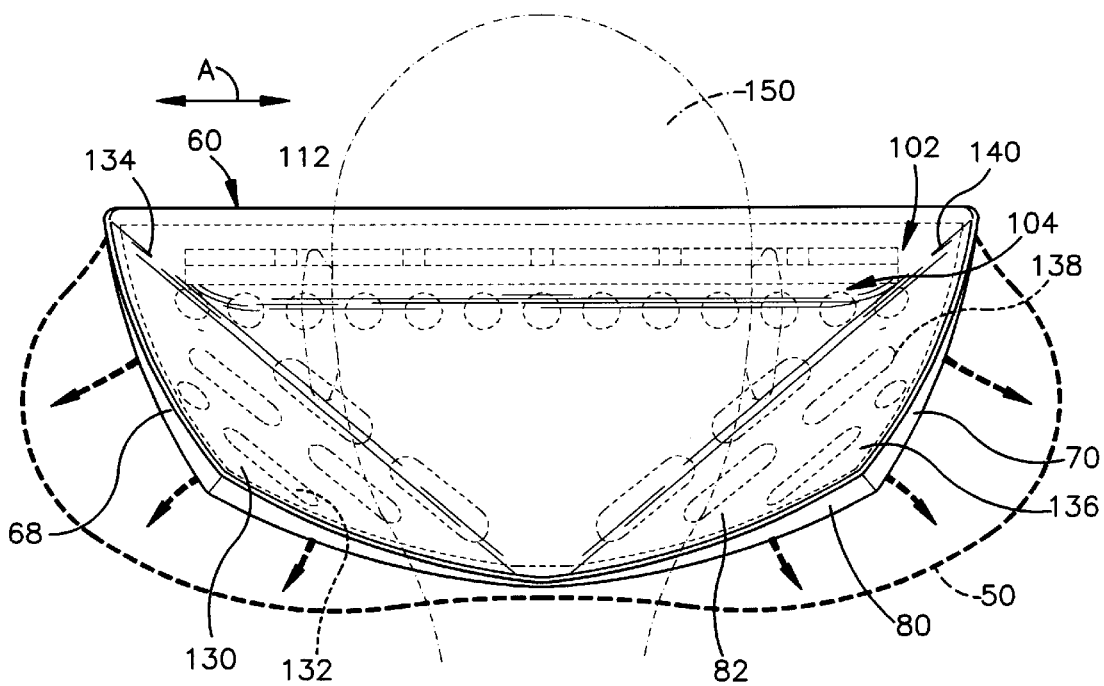
FIG. 4 is a view taken along line 4—4 in FIG. 3.

The aforementioned flexing of the deployment door 60 during deployment of the air bag 50 is illustrated in FIGS. 3 and 4. The main body portion 128 of the substrate 80 of the deployment door 60 is moved by the inflating air bag 50 toward the occupant's head 150. The inflating air bag 50 pushes against the first and second side sections 130 and 136 of the substrate 80, which are not engaged with a part of the occupant. The force of the inflating air bag 50 on the first side section 130 causes the substrate 80 to bend in the first area 122 of reduced stiffness formed by the array of slots 132. The first side section 130 bends inward, toward and around the occupant's head 150, about the second axis 134. It should be understood that the location of the second axis 134 illustrated in the Figures is exemplary in nature. The exact location of the second axis 134 will depend on the pressure profile inside the air bag 50 and on where the occupant's head 150 actually contacts the deployment door 60.

The inward bending of the first side section 130 of the substrate 80 provides clearance around the first side 68 of the deployment door 60 for the air bag 50 to continue expanding into the passenger compartment 14. The additional clearance provided by the flexing of the first side section 130 around the occupant's head 150 reduces the force transferred to the occupant's head during deployment of the air bag 50.

In a similar fashion, the force of the inflating air bag 50 on the second side section 136 causes the substrate 80 to bend in the second area 124 of reduced stiffness formed by the array of slots 138. The second side section 136 bends inward, toward and around the occupant's head 150, about the third axis 140. Again, it should be understood that the location of the third axis 140 illustrated in the Figures is exemplary in nature. The exact location of the third axis 140 will depend on the pressure profile inside the air bag 50 and on where the occupant's head 150 actually contacts the deployment door 60.

The inward bending of the second side section 136 of the substrate 80 provides clearance around the second side 70 of the deployment door 60 for the air bag 50 to continue expanding into the passenger compartment 14. The additional clearance provided by the flexing of the second side section 136 around the occupant's head 150 further reduces the force transferred to the occupant's head during deployment of the air bag 50.

Figure 5:
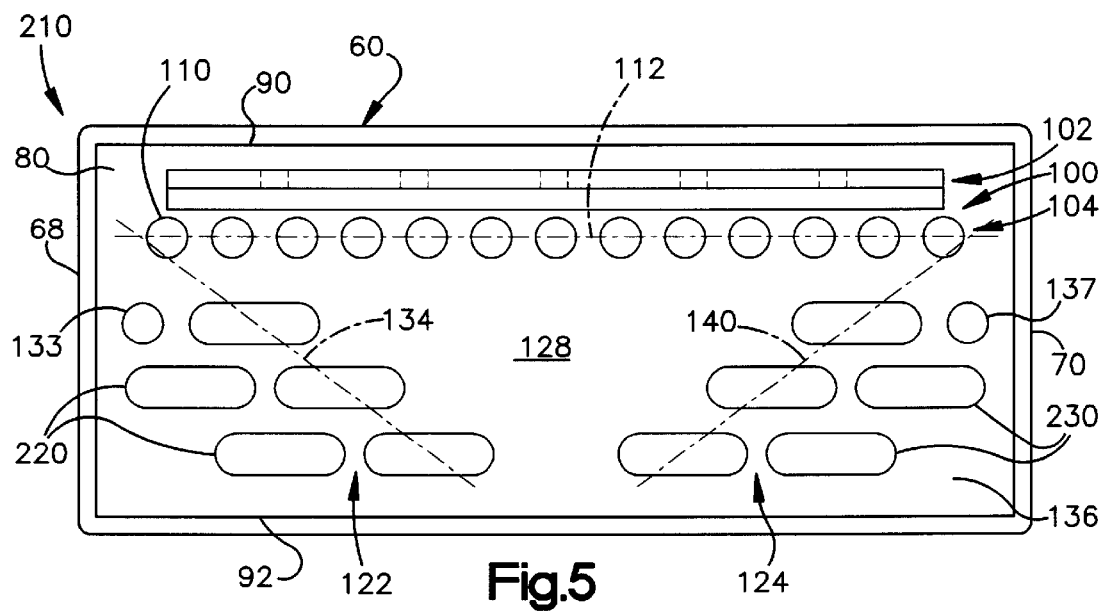
FIG. 5 is a view similar to FIG. 2 illustrating a second embodiment of the present invention.

FIG. 5 illustrates an apparatus 210 constructed in accordance with a second embodiment of the present invention. In the second embodiment of FIG. 5, reference numbers that are the same as those used in the first embodiment of FIGS. 1–4 designate parts that are the same as parts in the first embodiment.

According to the second embodiment, the first area 122 of reduced stiffness is formed by an array of slots 220 that extend parallel to the upper and lower edges 90 and 92 of the substrate 80, rather than at an angle relative to the upper and lower edges as in the first embodiment. Likewise, the second area 124 of reduced stiffness in the substrate is formed by an array of slots 230 that extend parallel to the upper and lower edges 90 and 92.

As in the apparatus 10 according to the first embodiment, the areas 122 and 124 of reduced stiffness in the deployment door 60 of the apparatus 210 enable the side sections 130 and 136, respectively, to flex around the head 150 of the occupant. Flexing of the side sections 130 and 136 permits the air bag 50 to expand around the sides 68 and 70 of the deployment door and thereby reduce the force transferred to the occupant's head 150 during deployment of the air bag.

Figure 6:
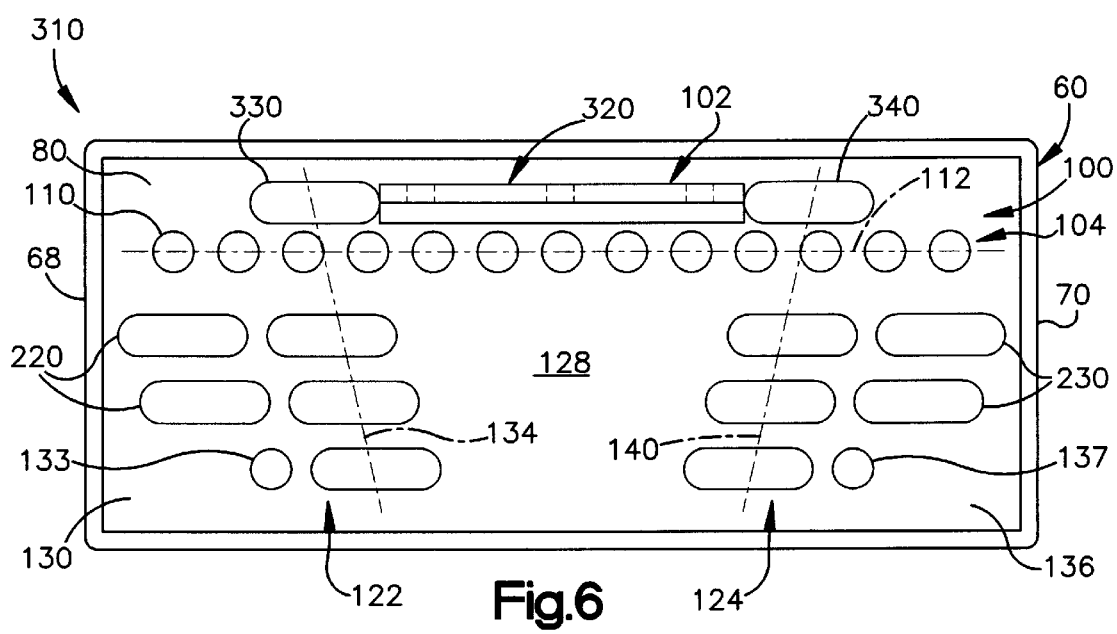
FIG. 6 is a view similar to FIG. 2 illustrating a third embodiment of the present invention.

FIG. 6 illustrates an apparatus 310 constructed in accordance with a third embodiment of the present invention. In the third embodiment of FIG. 6, reference numbers that are the same as those used in the first and second embodiments of FIGS. 1–5 designate parts that are the same as parts in the previous embodiments.

According to the third embodiment, the hinge area 100 has an attachment portion 320 that does not extend beyond the lateral width of the main body portion 128 of the substrate 80. Further, an additional slot 330 is added to the array of slots 220 that form the first area 122 of reduced stiffness. The additional slot 330 is located between the hinge portion 104 of the hinge area 100 and the upper edge 90 of the substrate 80. The additional slot 330 can allow the second axis 134, about which the first side section 130 bends, to shift more toward the central section 126 of the substrate 80. In addition, the alignment of the slots 220 can be changed slightly, as may be seen in FIG. 6, to further aid in shifting the second axis 134.

According to the third embodiment, an additional slot 340 is also added to the array of slots 230 that form the second area 124 of reduced stiffness. The additional slot 340 is located between the hinge portion 104 of the hinge area 100 and the upper edge 90. The additional slot 340 can allow the third axis 140, about which the second side section 136 bends, to shift more toward the central section 128 of the substrate 80. In addition, the alignment of the slots 230 can be changed slightly, as may be seen in FIG. 6, to further aid in shifting the third axis 140.

As in the apparatus 10 according to the first embodiment, the areas 122 and 124 of reduced stiffness in the deployment door 60 of the apparatus 310 enable the side sections 130 and 136, respectively, to flex around the head 150 of the occupant. Flexing of the side sections 130 and 136 permits the air bag 50 to expand around the lateral sides 68 and 70 of the deployment door and thereby reduce the force transferred to the occupant's head during deployment of the air bag.

Figure 7:
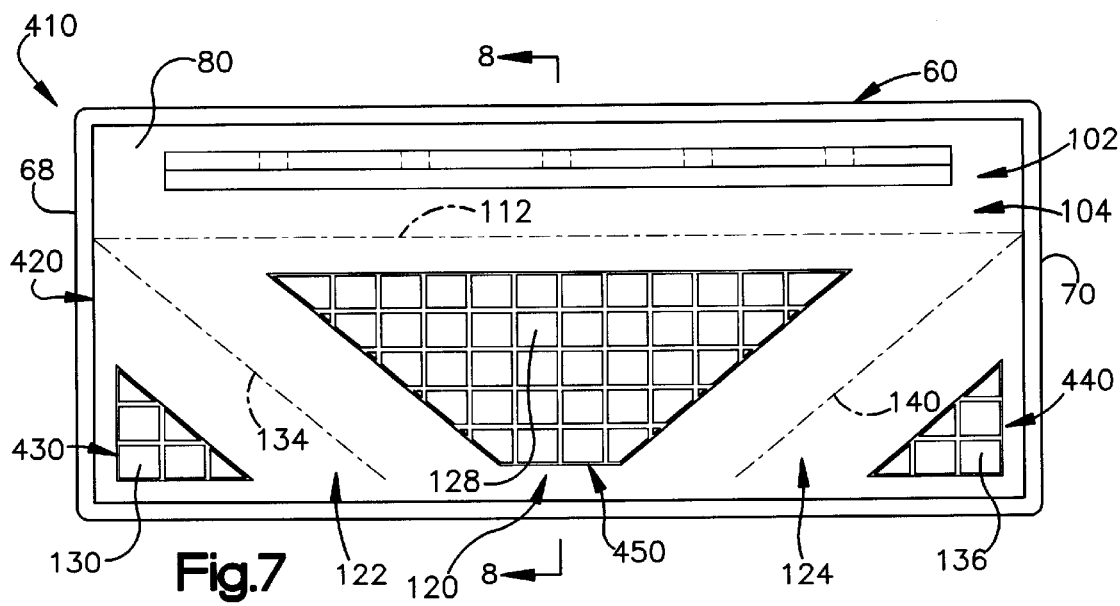
FIG. 7 is a view similar to FIG. 2 illustrating a fourth embodiment of the present invention.
Figure 8:
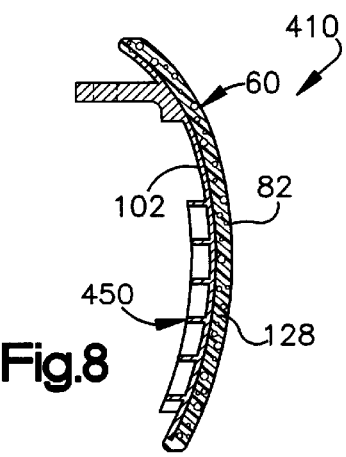
FIG. 8 is a sectional view taken along 8—8 in FIG. 7.

FIGS. 7 and 8 illustrate an apparatus 410 constructed in accordance with a fourth embodiment of the present invention. In the fourth embodiment of FIGS. 7 and 8, reference numbers that are the same as those used in the first embodiment of FIGS. 1–4 designate parts that are the same as parts in the first embodiment.

According to the fourth embodiment, the deployment door 60 has a substrate 420 that is made of a hard polymeric material. The first side section 130 of the substrate 420 includes a first set of ribs 430 that stiffen the first side section. Similarly, the second side section 136 of the substrate 420 includes a second set of ribs 440 that stiffen the second side section. Further, the central section 128 of the substrate 420 includes a third set of ribs 450 that stiffen the central section of the main body portion 120.

The first area 122 of reduced stiffness in the substrate 420 is defined between the first set of ribs 430 and the third set of ribs 450. The second area 124 of reduced stiffness in the substrate 420 is defined between the second set of ribs 440 and the third set of ribs 450. The hinge portion 104 is defined between the attachment portion 102 of the substrate 420 and the third set of ribs 450.

As in the apparatus 10 according to the first embodiment, the areas 122 and 124 of reduced stiffness in the deployment door 60 of the apparatus 410 enable the side sections 130 and 136, respectively, to flex around the head 150 of the occupant. Flexing of the side sections 130 and 136 the air bag 50 permits to expand around the sides 68 and 70 of the deployment door and thereby reduce the force transferred to the occupant's head during deployment of the air bag.

Figure 9:
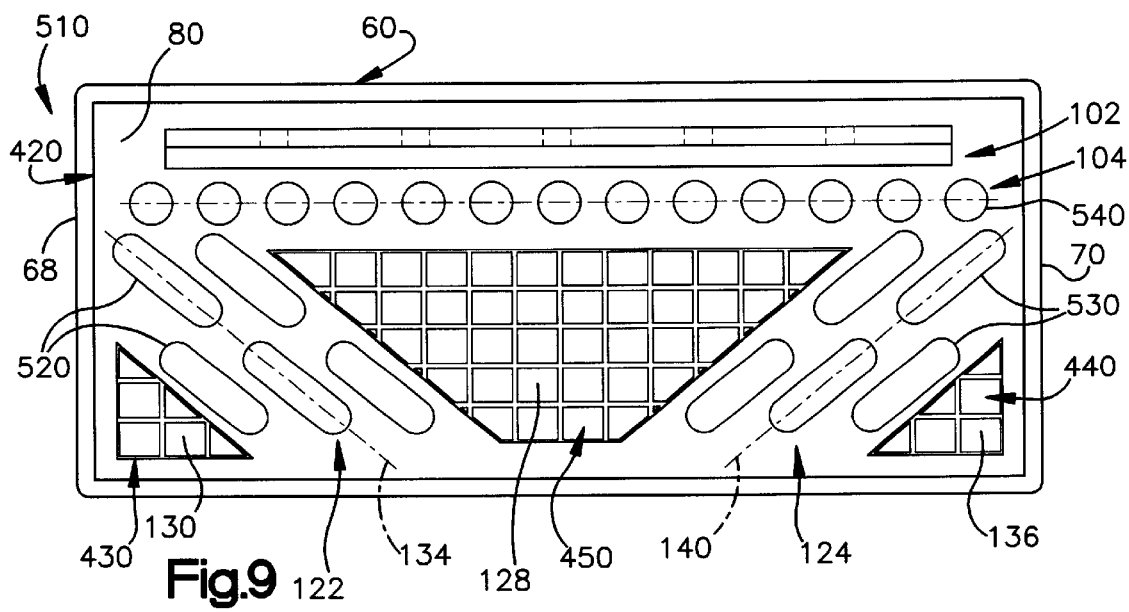
FIG. 9 is a view similar to FIG. 7 illustrating a fifth embodiment of the present invention.

FIG. 9 illustrates an apparatus 510 constructed in accordance with a fifth embodiment of the present invention. In the fifth embodiment of FIG. 9, reference numbers that are the same as those used in the first and fourth embodiments are used to designate parts that are the same as parts in the first and fourth embodiments.

According to the fifth embodiment, the first area 122 of reduced stiffness in the substrate 420 between the first set of ribs 430 and the third set of ribs 450 includes an array of apertures 520 that weaken the substrate to aid in flexing of the deployment door 60. Similarly, the second area 124 of reduced stiffness in the substrate 420 between the second set of ribs 440 and the third set of ribs 450 includes an array of apertures 530 that weaken the substrate to aid in flexing of the deployment door 60. The hinge portion 104 between the attachment portion 102 of the substrate 420 and the third set of ribs 450 also includes an array of openings 540 that weaken the substrate to aid in flexing of the deployment door 60.

As in the apparatus 10 according to the first embodiment, the areas 122 and 124 of reduced stiffness in the deployment door 60 of the apparatus 510 enable the side sections 130 and 136, respectively, to flex around the head 150 of the occupant. Flexing of the side sections 130 and 136 permits the air bag 50 to expand around the sides 68 and 70 of the deployment door and thereby reduce the force transferred to the occupant's head during deployment of the air bag.

From the above description of the invention, those skilled in the art will perceive improvements, changes and modifications. For example, it is contemplated that the apparatus disclosed herein could be utilized in other known locations where a deployment door is used to cover an inflatable air bag, such as a side impact air bag module. Such improvements, changes and modifications within the skill of the art are intended to be covered by the appended claims.

Having described the invention, we claim:

1. An apparatus for use in a vehicle, said apparatus comprising:

an air bag module mounted in the vehicle, said air bag module including an inflatable air bag for helping to protect a vehicle occupant in the event of a vehicle collision and an opening through which said air bag deploys when inflated;

a deployment door covering said opening, said deployment door including a first edge and a hinge area extending parallel to said first edge, said hinge area having an attachment portion connected to the vehicle and a hinge portion at which said deployment door pivots to allow said air bag to deploy, said hinge portion having oppositely disposed first and second ends, said deployment door, when said air bag is deployed, pivoting about a first axis at said hinge portion; and means for allowing said deployment door to pivot about a second axis, said second axis being transverse to, and intersecting, said first axis, said deployment door having a second edge disposed opposite said first edge, said second edge including a central portion;

said allowing means including first and second areas of reduced stiffness, said first area of reduced stiffness extending from said first end of said hinge portion toward said central portion of said second edge and defining a first side section of said deployment door, said second area of reduced stiffness extending from said second end of said hinge portion toward said central portion of said second edge and defining a second side section of said deployment door;

said first and second areas of reduced stiffness enabling said first and second side sections, respectively, of said deployment door to flex around parts of the vehicle occupant that may be blocking pivotal movement of said deployment door at said hinge portion during deployment of said air bag.

2. The apparatus of claim 1 wherein said first area of reduced stiffness enables said first side section of said deployment door to flex about said second axis.

3. The apparatus of claim 2 wherein said second area of reduced stiffness enables said second side section of said deployment door to flex about a third axis that is transverse to both of said first and second axes.

4. The apparatus of claim 1 wherein said first and second areas of reduced stiffness enable said first and second side sections, respectively, of said deployment door to flex about said second axis and a third axis that are both transverse to said first axis.

5. The apparatus of claim 1 wherein said deployment door comprises a substrate made of a relatively rigid first material and an outer layer made of a relatively flexible second material that is applied to said substrate.

6. The apparatus of claim 5 wherein said substrate is made of metal and said outer layer is made of a polymer.

7. The apparatus of claim 5 wherein said substrate is made of a hard polymer and said outer layer is made of polymeric foam.

8. The apparatus of claim 5 wherein said substrate includes an array of first apertures that form said first area of reduced stiffness in said deployment door and an array of second apertures that form said second area of reduced stiffness in said deployment door.

9. The apparatus of claim 8 wherein said first and second apertures comprise slots extending parallel to said first and second edges of said deployment door.

10. The apparatus of claim 8 wherein said first apertures comprise slots extending from said first end of said hinge portion of said deployment door toward said central portion of said second edge of said deployment door.

11. The apparatus of claim 10 wherein said second apertures comprise slots extending from said second end of said hinge portion of said deployment door toward said central portion of said second edge of said deployment door.

12. The apparatus of claim 8 wherein said first and second apertures comprise a combination of circular holes and elongated slots formed in said substrate.

13. The apparatus of claim 5 wherein said substrate includes a first set of ribs in said first side section of said deployment door, a second set of ribs in said second side section of said deployment door, and a centrally located third set of ribs, said first area of reduced stiffness in said deployment door being defined between said first set of ribs and said third set of ribs, said second area of reduced stiffness in said deployment door being defined between said second set of ribs and said third set of ribs.

14. The apparatus of claim 13 wherein said substrate includes an array of first apertures in said first area of reduced stiffness in said deployment door and an array of second apertures in said second area of reduced stiffness in said deployment door.

15. The apparatus of claim 5 wherein said hinge portion of said deployment door is formed by a plurality of openings in said substrate.

16. An apparatus for use in a vehicle, said apparatus comprising:

an air bag module mounted in the vehicle, said air bag module including an inflatable air bag for helping to protect a vehicle occupant in the event of a vehicle collision and an opening through which said air bag deploys when inflated; and a deployment door covering said opening, said deployment door including a first edge and a hinge area extending parallel to said first edge, said hinge area having an attachment portion connected to the vehicle and a hinge portion at which said deployment door pivots to allow said air bag to deploy, said hinge portion having oppositely disposed first and second ends;

said deployment door having a second edge disposed opposite said first edge, said second edge including a central portion;

said deployment door further including first and second areas of reduced stiffness, said first area of reduced stiffness extending from said first end of said hinge portion toward said central portion of said second edge and defining a first side section of said deployment door, said second area of reduced stiffness extending from said second end of said hinge portion toward said central portion of said second edge and defining a second side section of said deployment door;

said first and second areas of reduced stiffness enabling said first and second side sections, respectively, of said deployment door to flex around parts of the vehicle occupant that may be blocking pivotal movement of said deployment door during deployment of said air bag, said deployment door, when said air bag is deployed, pivoting about a first axis at said hinge portion, said first area of reduced stiffness enabling said first side section of said deployment door to flex about a second axis that is transverse to said first axis, said second area of reduced stiffness enabling said second side section of said deployment door to flex about a third axis that is transverse to both of said first and second axes.

* * * * *